United States Patent
Taghavi Larigani et al.

(10) Patent No.: US 7,330,246 B2
(45) Date of Patent: Feb. 12, 2008

(54) TILT METER BASED ON THE FIELD TRANSMISSION THROUGH A RESONATOR

(75) Inventors: Shervin Taghavi Larigani, Pasadena, CA (US); Jakob J. van Zyl, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/399,552

(22) Filed: Apr. 5, 2006

(65) Prior Publication Data

US 2006/0221327 A1 Oct. 5, 2006

Related U.S. Application Data

(60) Provisional application No. 60/668,534, filed on Apr. 5, 2005.

(51) Int. Cl.
*G01B 11/26* (2006.01)
(52) U.S. Cl. .................................. 356/138; 356/139.07
(58) Field of Classification Search ................. 356/138
See application file for complete search history.

(56) References Cited

U.S. PATENT DOCUMENTS

2006/0139626 A1* 6/2006 Childers et al. ............ 356/138

OTHER PUBLICATIONS

S. Taccheo, et al., "Linearly polarized, single-frequency, widely tunable Er:Yb bulk laser at around 1550 nm wavelength,"Appl. Phys. Lett. 69 (21), Nov. 18, 1996, pp. 3128-3130.
A. Yariv, "Optical Electronics in Modern Communications," Oxford University Press 1996.

* cited by examiner

*Primary Examiner*—Roy M. Punnoose
(74) *Attorney, Agent, or Firm*—Tope-McKay & Associates

(57) ABSTRACT

Described is a tilt meter for monitoring angle shift in an incident signal. The tilt meter includes a resonator for receiving an incident signal from a signal transmitter and outputting a resonated signal. An incident angle exists between a plane normal to the resonator and the incident signal. A sensor is included for sensing the resonated signal. A processor is connected with the sensor and is configured to compare intensities of the incident signal and the resonated signal. Based upon the comparison, the processor determines if and by how much the incident angle has changed.

14 Claims, 4 Drawing Sheets

TILT METER BASED ON THE FIELD TRANSMISSION THROUGH A RESONATOR

PRIORITY CLAIM

The present application is a non-provisional application, claiming the benefit of priority of U.S. Provisional Application No. 60/668,534, filed on Apr. 5, 2005, entitled, "Novel Tilt Meter Based on the Field Transmission through a Resonator."

BACKGROUND OF THE INVENTION (1) Field of the Invention

The present invention relates to a tilt meter, and more particularly, to a tilt meter for monitoring angle shift in an incident signal based on a transmission through a resonator.

(2) Description of Related Art

Resonators are bodies in which periodic events such as oscillations take place. There are a range of resonators over a wide range of fields, such as electronic, mechanic, optics, and others. One way of measuring the "quality" of a resonator is by using the Q factor of that resonator. The Q factor or quality factor is a measure of the "quality" of a resonant system. Resonant systems respond to inputs (e.g., frequencies, angles of incidence, etc.) close to their natural resonances much more strongly than they respond to other inputs. The Q factor indicates the amount of resistance to resonance in a system. Systems with a high Q factor resonate with a greater amplitude (at the resonant frequency) than systems with a low Q factor. Damping decreases the Q factor. Resonators have therefore been used to measure and monitor any change in frequency since a change in frequency would decrease the Q factor of the system.

In addition to monitoring a change in frequency, it is desirable in some circumstances to monitor the angle of incident. However, nothing heretofore devised has used a resonator to monitor this angle.

Thus, a continuing need exists for a system that allows a user to monitor the angle of incident based on a transmission through a resonator.

SUMMARY OF INVENTION

The present invention relates to a tilt meter for monitoring angle shift in an incident signal. The tilt meter comprises a resonator for transmitting or reflecting an incident signal that is introduced to the resonator as a plane wave. The incident signal is introduced such that an incident angle exists between the plane wave and a plane normal to the resonator. The resonator is further capable of transmitting or reflecting the incident signal as a resonated signal. A sensor is included for sensing the resonated signal. A processor is connected with the sensor and configured to compare intensities of the incident signal and the resonated signal. Based upon the comparison, the processor is further configured to determine by how much the incident angle has changed.

In another aspect, the processor is further configured to calculate the change in the incident angle according to the following:

$$d\theta = \frac{(1-R)^2}{RT^2} \frac{\lambda}{4\pi n l \sin(\delta)\sin(\theta)} dT.$$

In the above equation, T denotes signal transmission intensity, dT denotes a change in the signal transmission intensity between the incident signal and resonated signal, R denotes the fraction of the intensity reflected, $\lambda$ denotes the vacuum wavelength of the incident wave, $\theta$ is the internal angle of incidence, n is the index of refraction, l is the distance between each of the parallel plates, and $\delta$ denotes a phase delay between two partial waves.

In yet another aspect, the resonator is a Fabry-Pérot etalon.

In another aspect, the present invention further comprises a signal transmitter for transmitting the incident signal to the resonator.

Finally, as can be appreciated by one skilled in the art, the present invention also comprises a method and computer program product for carrying out the operations of the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
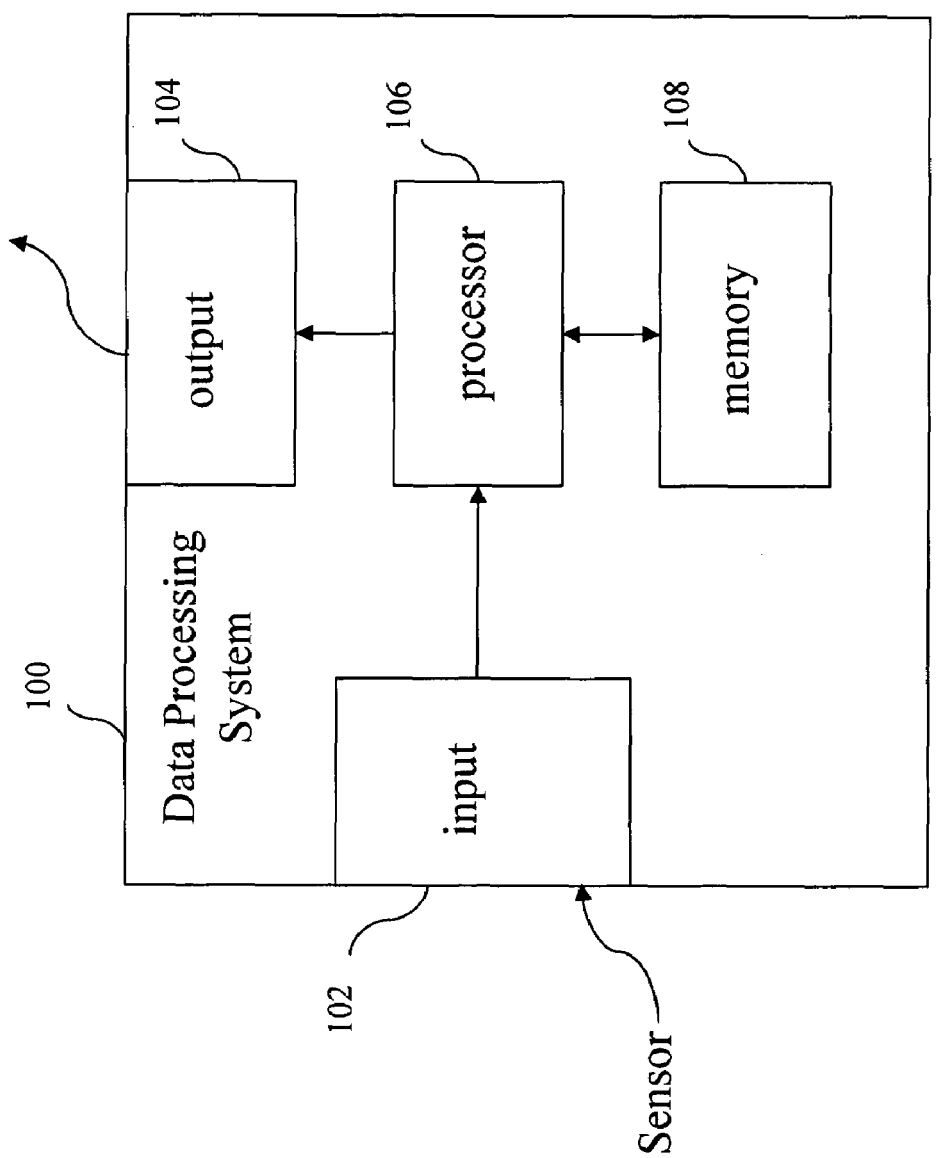
FIG. 1 is a flow chart illustrating a data processing system according to the present invention.

The present invention relates to a tilt meter, and more particularly, to a tilt meter for monitoring angle shift in an incident signal based on a transmission through a resonator. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Second, a description of various principal aspects of the present invention is provided. Third, a description of various aspects of the present invention is provided to give an understanding of the specific details.

(1) Glossary

Before describing the specific details of the present invention, a glossary is provided in which various terms used herein and in the claims are defined. The glossary is presented to provide the reader with a general understanding of the intended meaning of the terms, but is not intended to convey the entire scope of each term. Rather, the glossary is intended to supplement the rest of the specification in more accurately explaining the terms used.

Angle tilt meter—The term "angle tilt meter" as used with respect to this invention refers to a mechanism or device that uses a resonator, sensor, and processor in order to detect changes in an incident angle.

Fabry-Pérot etalon—The term "Fabry-Pérot etalon" as used with respect to this invention refers to a transparent plate with two reflecting surfaces. Its transmission spectrum as a function of wavelength exhibits peaks of large transmission corresponding to resonances of the etalon. For example, Etalons are widely used in telecommunications, lasers, and spectroscopy for controlling and measuring the wavelength of light. See Fabry-Pérot interferometer, http://en.wikipedia.org/w/index.php?title=Fabry-P%C3%A9rot_interferometer&oldid=45134847 (last visited Mar. 30, 2006).

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Resonator—The term "resonator" as used with respect to this invention generally refers to a mechanism or device that allows for the resonant oscillation of an input signal and provides an output transmitted and/or reflected signal.

(2) Principal Aspects

The present invention has three "principal" aspects. The first is a tilt meter for monitoring an incident signal's incident angle, based on a transmission through a resonator. The tilt meter includes a resonator, a sensor, and a computer system operating software or in the form of a "hard-coded" instruction set. The tilt meter may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting some of the components of the system of the present invention is provided in FIG. 1. The system 100 comprises an input 102 for receiving information from a sensor. Note that the input 102 may include multiple "ports." An output 104 is connected with the processor for providing information regarding an angle change of the incident signal. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
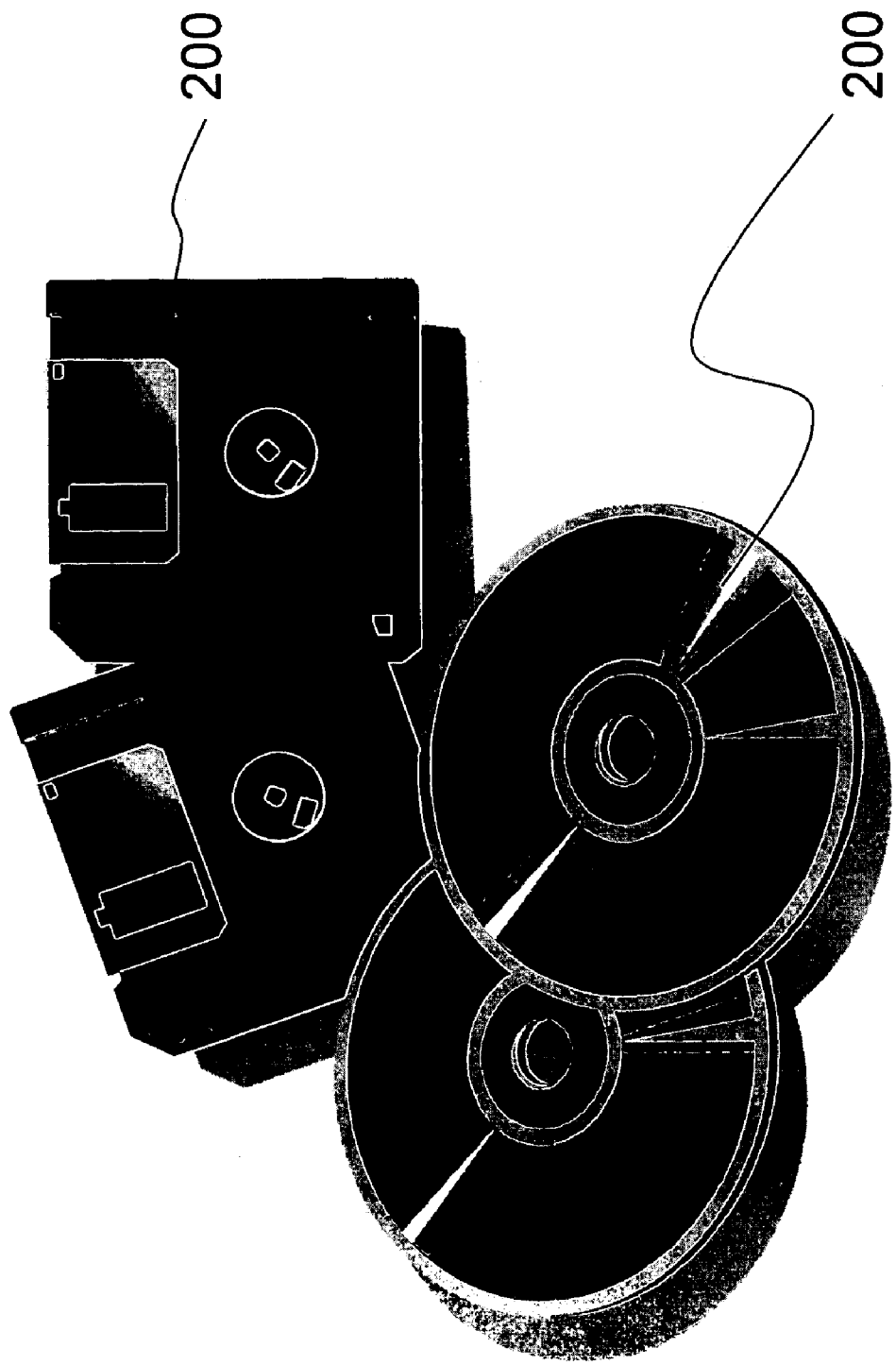
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instruction means stored on any compatible computer-readable medium.

(3) Description of Various Aspects

The present invention relates to tilt meter for monitoring angle shift in an incident signal based on a transmission through a resonator. As described above, resonators have been used to measure and monitor changes in frequency because a change in the frequency descreases the quality factor of the resonator.

Within some region of application, the quality factor is much more sensistive to angle shift than it is to frequency shift. Using its quality factor, the present invention utilizes the resonator to measure any angle shift from the optimum angle of incidence. The resonator is any suitable a mechanism or device that allows for the resonant oscillation of an input signal, a non-limiting example of which includes a Fabry-Pérot etalon. Other non-limiting examples include a hollow chamber whose dimensions allow the resonant oscillation of electromagnetic or acoustic waves, and an electrical circuit that combines capacitance and inductance in such a way that a periodic electric oscillation will reach maximum amplitude.

Using the resonator, an incident signal is introduced to the resonator. The measured angle is the incident angle of the signal entering the resonator. Each time this angle shifts, it changes the transmitted intensity and reflected intensity. The degree to which the incident angle has been changed can be deduced by measuring either the transmitted intensity or the reflected intensity.

Figure 3:
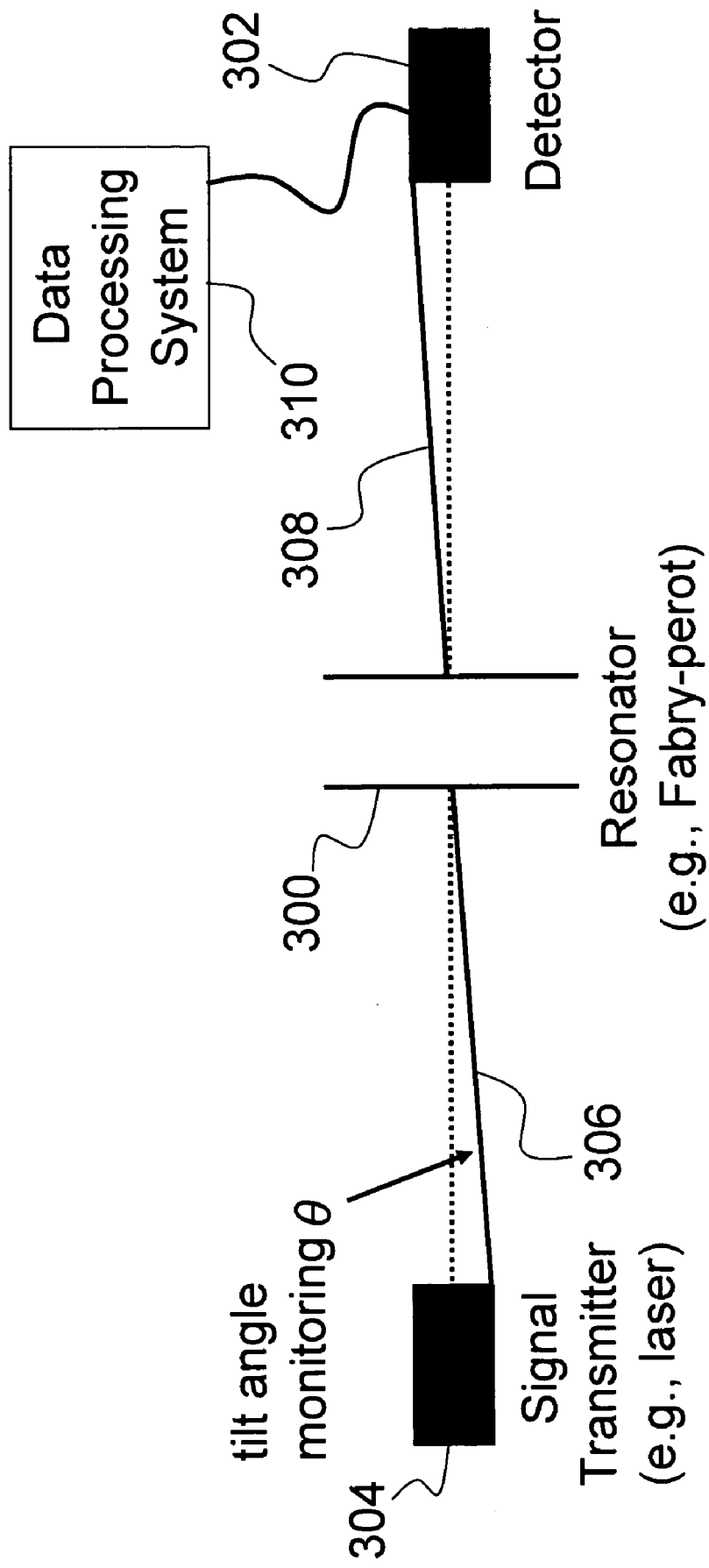
FIG. 3 is an illustration depicting a laser beam such that any angle change of the laser beam results in a change of the intensity transmission of the resonator.

As shown in FIG. 3, the tilt meter includes a resonator 300 with a detector 302 positioned proximate the resonator 300. A signal transmitter 304 (e.g., laser) is included that directs an incident signal 306 to the resonator 300, which then becomes a resonated signal 308. The resonated signal 308 is thereafter received by the detector 302. A data processing system 310 is included that measures the change in intensity between the incident signal 306 and the resonated signal 308. If the angle of the input signal (e.g., light) changes, the transmission through the resonator changes. Based on the change of intensity between the signals 306 and 308, the data processing system 310 calculates any change in the angle of transmission.

The signal transmitter 304 is any mechanism or device capable of transmitting a signal to the resonator 300, a non-limiting example of which includes a laser. The detector 302 is any mechanism or device capable of sensing and/or receiving a signal, a non-limiting example of which includes an optical sensor.

In order for the resonator 300 to operate effectivly in detecting a change in the incident angle, the transmission of the signal through the resonator 300 must be more sensistive to a change in the incident angle than to a change of the wavelength of the incident light. Described below are boundary conditions to determine when the transmission of an incident light through a resonator (e.g., Fabry-Pérot etalon) is more sensitive to its wavelength change of or to its incident angle change.

Figure 4:
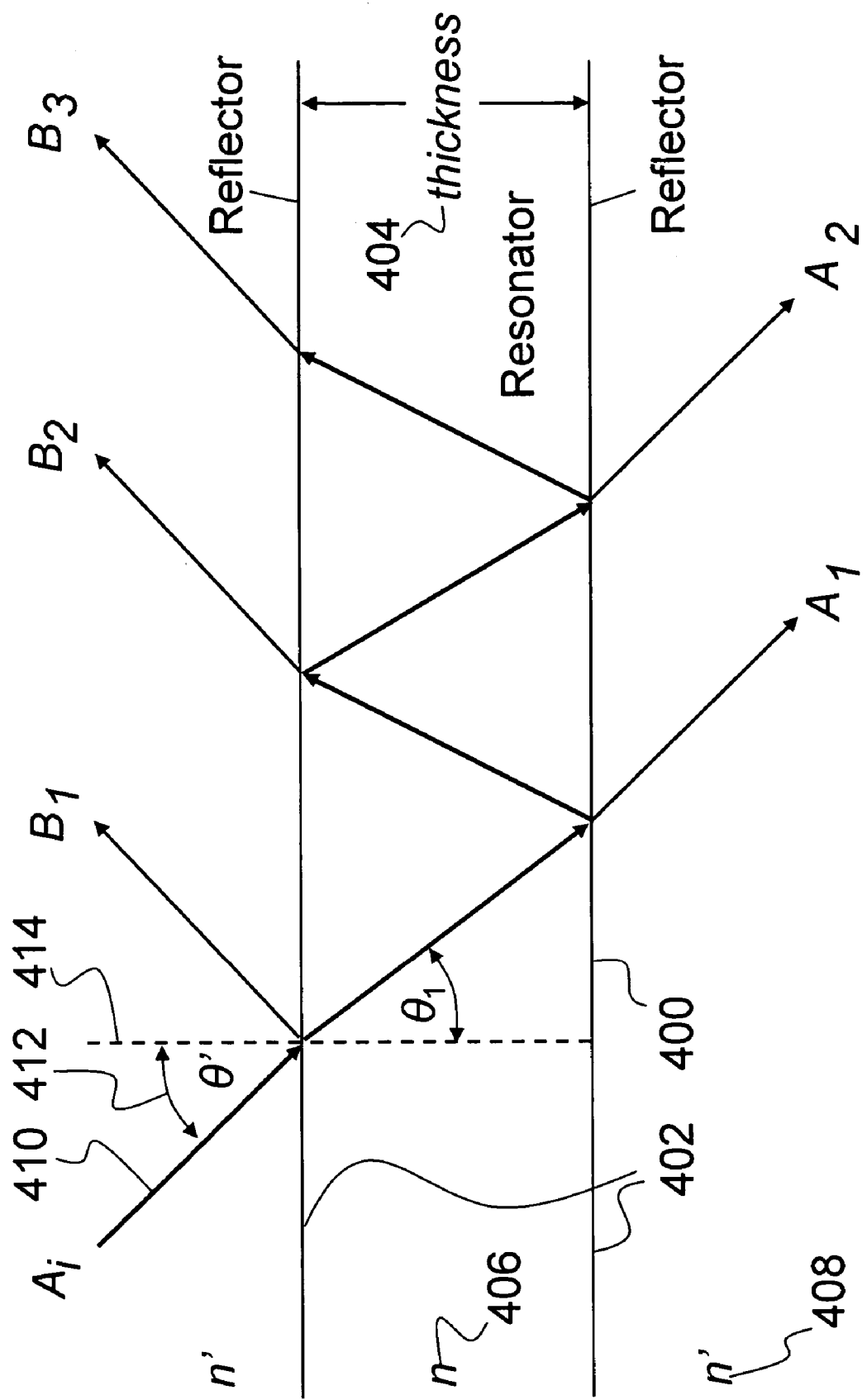
FIG. 4 is an illustration of a multiple reflection model according to the present invention.

For illustrative purposes, the following example uses a Fabry-Pérot resonator (interferometer). As can be appreciated by one skilled in the art, although specific examples and dimensions may be used, they are used for illustrative purposes only as the present invention is not intended to be limited thereto. As shown in FIG. 4, the resonator 400 (e.g., Fabry-Pérot interferometer) consists of a plane-parallel plate 402 of thickness 404 1 and index of refraction n 406. The resonator 400 is immersed in a medium of index of refraction n' 408. A plane wave 410 is set such that it is incident on the etalon at an angle θ' 412 to the normal 414. A problem of the transmission (and reflection) of the plane wave through the etalon can be treated by considering the infinite number of partial waves produced by reflections at the two end surfaces. The phase delay between two partial waves which is attributable to one additional round trip, is given by:

$$\delta = \frac{-4\pi n l}{\lambda}\cos(\theta), \quad (1)$$

where λ denotes the vacuum wavelength of the incident wave, θ is the internal angle of incidence, n is the index of refraction, and l is the distance between each of the parallel plates. If the complex amplitude of the incident wave is taken as $A_i$, then the partial reflections $B_1$, $B_2$, $B_3$ and so forth, are given by:

$$B_1 = rA_i \; B_2 = tr't'A_i e^{j\delta} \; B_3 = tr'r'r't'A_i e^{2j\delta}$$

In the above equations, r denotes the reflection coefficient (ratio of reflected to incident amplitude (when the field is coming from n' toward n)), t denotes the transmission coefficient for waves traveling from material with index n' toward material with index n. r' and t' are the corresponding quantities for waves traveling from material with index n toward material with index n'. Additionally, δ denotes the phase delay between two partial waves and $j=\sqrt{-1}$. The complex amplitude of the total reflected wave is calculated according to the following:

$$A_r = B_1 + B_2 + B_3 + \ldots$$

$$A_r = \{r + tt'r'e^{j\delta}(1 + r'^2 e^{j\delta} + \ldots)\}A_i.$$

The amplitudes of the transmitted waves are calculated as follows:

$$A_1 = tt'A_i \; A_2 = tt'r'^2 e^{j\delta} A_i \; A_3 = tt'r'^4 e^{2j\delta} A_i$$

Adding up the A terms provides the complex amplitude of the total transmitted wave, which is calculated according to the following:

$$A_t = A_i tt'(1 + r'^2 e^{j\delta} + r'^4 e^{2j\delta} + \ldots).$$

It can be shown that the Fabry-Pérot etalon has an intensity transmission that is calculated according to the following:

$$\text{Transmission} = \frac{(1-R)^2}{(1-R)^2 + 4R\sin^2\left(\frac{\delta}{2}\right)}, \quad (2)$$

where R denotes the fraction of the intensity reflected. Assuming that the geometry and material properties remain constant, equation (2) shows that the transmission is a function of the wavelength of the input signal.

The prior art uses the transmission intensity dependence on the wavelength of the input field to monitor any wavelength change of the input field. The present invention expands upon the prior art by using the transmission intensity to monitor any angle change of the input field, as shown in FIG. 3.

Reviewing equation (2), it is clear that the transmission intensity is also angle-dependent. The transmission intensity is calculated according to the following:

$$\text{Transmission} = \frac{(1-R)^2}{(1-R)^2 + 4R\sin^2\left(\frac{-2\pi n l \cos(\theta)}{\lambda}\right)}. \quad (3)$$

Taking the derivation of equation (3) provides the following:

$$\frac{\partial T}{\partial \theta} = \frac{8(1-R)R\sin^2\left(\frac{\delta}{2}\right)\frac{\partial R}{\partial \theta} - 4(1-R)^2\sin^2\left(\frac{\delta}{2}\right)\frac{\partial R}{\partial \theta} - 4(1-R)^2\sin\left(\frac{\delta}{2}\right)\cos\left(\frac{\delta}{2}\right)\frac{\partial \delta}{\partial \theta}}{\left[(1-R)^2 + 4R\sin^2\left(\frac{-2\pi n l \cos(\theta)}{\lambda}\right)\right]^2}. \quad (4)$$

If the reflection R is angle independent, meaning $$\frac{\partial R}{\partial \theta} \approx 0$$

within the working range, then $$\frac{\partial T}{\partial \theta} = -T\frac{4R\sin\left(\frac{\delta}{2}\right)\cos\left(\frac{\delta}{2}\right)\frac{\partial \delta}{\partial \theta}}{(1-R)^2 + 4R\sin^2\left(\frac{\delta}{2}\right)}, \quad (5)$$

with $$\frac{\partial \delta}{\partial \theta} = \frac{-4\pi n l \sin(\theta)}{\lambda}. \quad (6)$$

Besides, $$\frac{\partial T}{\partial \lambda} = -T\frac{4R\sin\left(\frac{\delta}{2}\right)\cos\left(\frac{\delta}{2}\right)\frac{\partial \delta}{\partial \theta}}{(1-R)^2 + 4R\sin^2\left(\frac{\delta}{2}\right)}\frac{4\pi n l \cos(\theta)}{\lambda^2}, \quad (7)$$

therefore,

-continued $$\frac{\left(\frac{\partial T}{\partial \lambda}\right)}{\left(\frac{\partial T}{\partial \lambda}\right)} = \tan(\theta)\lambda. \qquad (8)$$

The variation of the signal (e.g., light) intensity transmission (dT) through the Fabry-Pérot resonator has two components. One is the contribution $$\frac{\partial T}{\partial \theta}$$

of an angle change dθ, while the other is the contribution $$\frac{\partial T}{\partial \lambda}$$

of the wavelength change dλ. Therefore, dT can be expressed as:

$$dT = \frac{\partial T}{\partial \theta} d\theta + \frac{\partial T}{\partial \lambda} d\lambda. \qquad (9)$$

To successfully monitor a change in the angle, the system needs to be more angle-sensitive than wavelength-sensitive, such that:

$$\left|\frac{\partial T}{\partial \theta} d\theta\right| > \left|\frac{\partial T}{\partial \lambda} d\lambda\right|. \qquad (10)$$

Alternatively, in order to successfully monitor wavelength, $$\left|\frac{\partial T}{\partial \theta} d\theta\right| < \left|\frac{\partial T}{\partial \lambda} d\lambda\right|. \qquad (11)$$

Using equation 8 and under the assumption of small angle change:

$$\tan(\theta) \approx \theta; \partial\theta \approx \theta \frac{\partial T}{\partial \theta} = \tan(\theta)\lambda \frac{\partial T}{\partial \lambda} \approx \theta\lambda \frac{\partial T}{\partial \lambda}. \qquad (12)$$

So, $$\left|\frac{\partial T}{\partial \theta} d\theta\right| > \left|\frac{\partial T}{\partial \lambda} d\lambda\right| \Rightarrow \left|\theta^2 \lambda \frac{\partial T}{\partial \lambda}\right| > \left|\frac{\partial T}{\partial \lambda} d\lambda\right|. \qquad (13)$$

Therefore, in satisfying $$\theta > \sqrt{\frac{d\lambda}{\lambda}}, \qquad (14)$$

equation 10 is satisfied. Furthermore, in satisfying $$\theta < \sqrt{\frac{d\lambda}{\lambda}}, \qquad (15)$$

equation 11 is satisfied.

From equations 2 through 7, wavelength changes can be monitored up to dλ=10⁻¹² meters for a central wavelength of λ=1.55 micrometers. Therefore, from equation 14, it is evident that with current technology, the system can detect an angle change θ as small as a few millidegrees.

Combining equations 5 and 6 provides the following equation for calculating the change of θ:

$$d\theta = \frac{(1-R)^2}{RT^2} \frac{\lambda}{4\pi n l \sin(\delta)\sin(\theta)} dT. \qquad (16)$$

Thus, using the above, a user can monitor an incident signal and any changes in its incident angle.

What is claimed is:

1. A tilt meter for monitoring angle shift in an incident signal, comprising:
   a resonator for transmitting or reflecting an incident signal that is introduced to the resonator as a plane wave, such that an incident angle exists between the plane wave and a plane normal to the resonator, the resonator further being capable of transmitting or reflecting the incident signal as a resonated signal;
   a sensor for sensing the resonated signal; and
   a processor connected with the sensor and configured to compare intensities of the incident signal and the resonated signal, and based upon the comparison, determine by how much the incident angle has changed.

2. A tilt meter as set forth in claim 1, wherein the processor is further configured to calculate the change in the incident angle according to the following:

$$d\theta = \frac{(1-R)^2}{RT^2} \frac{\lambda}{4\pi n l \sin(\delta)\sin(\theta)} dT,$$

where T denotes signal transmission intensity, dT denotes a change in the signal transmission intensity between the incident signal and resonated signal, R denotes the fraction of the intensity reflected, r. denotes the vacuum wavelength of the incident wave, θ is the internal angle of incidence, n is the index of refraction, l is the distance between each of the parallel plates, and δ denotes a phase delay between two partial waves.

3. A tilt meter as set forth in claim 2, wherein the resonator is a Fabry-Perot etalon.

4. A tilt meter as set forth in claim 3, further comprising a signal transmitter for transmitting the incident signal to the resonator.

5. A tilt meter as set forth in claim 1, wherein the resonator is a Fabry-Perot etalon.

6. A tilt meter as set forth in claim 1, further comprising a signal transmitter for transmitting the incident signal to the resonator.

7. A method for monitoring angle shift in an incident signal, comprising acts of:
  introducing an incident signal to a resonator as a plane wave such that an incident angle exists between the plane wave and a plane normal to the resonator, wherein the incident signal has an incident signal intensity and the incident signal is introduced to the resonator such that upon contact with the resonator, the incident signal becomes a resonated signal with a resonated signal intensity;
  receiving the resonated signal;
  measuring the difference between the incident signal intensity and the resonated signal intensity;
  calculating a change in the incident angle based on the difference between the intensities; and
  outputting a signal to provide the change in the incident angle.

8. A method as set forth in claim 7, further comprising an act of utilizing a processor to calculate the change in the incident angle according to the following:

$$d\theta = \frac{(1-R)^2}{RT^2} \frac{\lambda}{4\pi n l \sin(\delta)\sin(\theta)} dT,$$

where T denotes signal transmission intensity, dT denotes a change in the signal transmission intensity between the incident signal and resonated signal, R denotes the fraction of the intensity reflected, λ denotes the vacuum wavelength of the incident wave, θ is the internal angle of incidence, n is the index of refraction, l is the distance between each of the parallel plates, and δ denotes a phase delay between two partial waves.

9. A method as set forth in claim 8, further comprising an act of utilizing a Fabry Perot etalon as the resonator.

10. A method as set forth in claim 9, further comprising an act of transmitting the incident signal to the resonator using a signal transmitter.

11. A method as set forth in claim 7, further comprising an act of utilizing a Fabry-Perot etalon as the resonator.

12. A method as set forth in claim 7, further comprising an act of transmitting the incident signal to the resonator using a signal transmitter.

13. A computer program product for monitoring angle shift in an incident signal, the computer program product comprising computer-readable instruction means encoded on a computer-readable medium that are executable by a computer for causing the computer to:
  receive information corresponding to an incident signal intensity, the incident signal intensity being a signal intensity of an incident signal that is introduced to a resonator as a plane wave such that an incident angle exists between the plane wave and a plane normal to the resonator;
  receive information corresponding to a resonated signal intensity, the resonated signal intensity being a signal intensity of resonated signal, where the incident signal is introduced to the resonator such that upon contact with the resonator, the incident signal becomes the resonated signal;
  measure the difference between the incident signal intensity and the resonated signal intensity;
  calculate a change in the incident angle based on the difference between the intensities; and
  output a signal to provide the change in the incident angle.

14. A computer program product as set forth in claim 13, further comprising instruction means encoded on a computer-readable medium that are executable by a computer for causing the computer to calculate the change in the incident angle according to the following:

$$d\theta = \frac{(1-R)^2}{RT^2} \frac{\lambda}{4\pi n l \sin(\delta)\sin(\theta)} dT,$$

where T denotes signal transmission intensity, dT denotes a change in the signal transmission intensity between the incident signal and resonated signal, R denotes the fraction of the intensity reflected, λ denotes the vacuum wavelength of the incident wave, θ is the internal angle of incidence, n is the index of refraction, l is the distance between each of the parallel plates, and δ denotes a phase delay between two partial waves.

* * * * *